(12) United States Patent
Fernandez et al.

(10) Patent No.: US 6,882,837 B2
(45) Date of Patent: Apr. 19, 2005

(54) LOCAL EMERGENCY ALERT FOR CELL-PHONE USERS

(75) Inventors: Dennis Sunga Fernandez, 1175 Osborn Ave., Atherton, CA (US) 94027; Megan Hu Fernandez, 1240 Avon St., Belmont, CA (US) 94002; Jared Richard Fernandez, 1240 Avon St., Belmont, CA (US) 94002

(73) Assignees: Dennis Sunga Fernandez, Atherton, CA (US); Megan Hu Fernandez, Atherton, CA (US); Jared Richard Fernandez, Atherton, CA (US)

( * ) Notice: Subject to any disclaimer, the term of this patent is extended or adjusted under 35 U.S.C. 154(b) by 279 days.

(21) Appl. No.: 10/056,463

(22) Filed: Jan. 23, 2002

(65) Prior Publication Data

US 2003/0207670 A1 Nov. 6, 2003

(51) Int. Cl.[7] .......................... H04B 7/185; H04M 11/00
(52) U.S. Cl. ................................ 455/404.1; 455/404.2; 455/521
(58) Field of Search ........................... 455/404.1, 404.2, 455/414.1, 456.1, 456.2, 500, 521, 414.2, 420, 556.1, 557; 340/825.36, 384.4, 870.15–870.16, 500, 540, 524, 527

(56) References Cited

U.S. PATENT DOCUMENTS

| 4,987,783 A | | 1/1991 | D'Antonio et al. |
|---|---|---|---|
| 5,278,539 A | * | 1/1994 | Lauterbach et al. ... 340/539.18 |
| 5,482,314 A | | 1/1996 | Corrado et al. |
| 5,629,693 A | | 5/1997 | Janky |
| 5,793,291 A | | 8/1998 | Thornton |
| 6,026,296 A | | 2/2000 | Sanders et al. |
| 6,084,510 A | | 7/2000 | Lemelson et al. |
| 6,091,956 A | | 7/2000 | Hollenberg |
| 6,112,075 A | * | 8/2000 | Weiser ..................... 455/404.1 |
| 6,161,071 A | | 12/2000 | Shuman et al. |
| 6,188,939 B1 | | 2/2001 | Morgan et al. |
| 6,307,920 B1 | | 10/2001 | Thomson et al. |
| 6,313,786 B1 | | 11/2001 | Sheynblat et al. |
| 6,323,803 B1 | | 11/2001 | Jolley et al. |
| 6,339,397 B1 | | 1/2002 | Baker |
| 6,369,705 B1 | * | 4/2002 | Kennedy ..................... 340/506 |
| 6,463,272 B1 | * | 10/2002 | Wallace et al. ........... 455/404.2 |
| 6,463,273 B1 | * | 10/2002 | Day ......................... 455/404.1 |
| 6,594,345 B1 | * | 7/2003 | Vinson ......................... 379/48 |
| 6,608,559 B1 | * | 8/2003 | Lemelson et al. ...... 340/539.13 |
| 2001/0041552 A1 | * | 11/2001 | Wingren et al. ............ 455/404 |

* cited by examiner

*Primary Examiner*—William Trost
*Assistant Examiner*—Brandon J. Miller
(74) *Attorney, Agent, or Firm*—Fernandez & Associates LLP

(57) ABSTRACT

Local emergency alert service for cell-phone or pager users is provided using regional or localized broadcast to or polling of available, voluntary, or otherwise identified wireless communication devices or other network-accessible nodes operating using different protocol in proximate help area, thus allowing such alerted users to respond to nearby emergency request or condition. Wireless communicator location is determined using relative satellite positioning, radio signal triangulation, or manual entry technique. Sensor may alert wireless communicator automatically of emergency condition.

19 Claims, 3 Drawing Sheets

LOCAL EMERGENCY ALERT FOR CELL-PHONE USERS

FIELD OF INVENTION

Invention relates to wireless communication, particularly to mobile communications devices and services configured to provide local emergency alert.

BACKGROUND OF INVENTION

Conventional cellular phones and other wireless communication devices enable users to make emergency telephone calls for help, or to receive personal messages requesting specific mobile assistance. As more people use portable communicators, it becomes increasingly convenient, and hopefully safer, for such people to obtain emergency assistance, especially during transit. However, sometimes such conventional communication systems and methods are still inadequate to meet emergency needs, for example, when emergency facilities are distant, or when individuals are too young or sick to request assistance. Accordingly, it would be desirable to provide improved approach for emergency communication.

SUMMARY OF INVENTION

Invention resides in local emergency alert service and system for cell-phone or pager users. Regional or local wireless broadcast to or polling of available, voluntary, or identified communication devices operating using one or more protocol in proximate help area allows alerted users to respond to nearby emergency request or condition. Wireless communicator location is determined by relative satellite positioning, radio signal triangulation, or manual entry. Sensor may alert wireless communicator automatically of emergency condition.

DETAILED DESCRIPTION OF EMBODIMENT

Figure 1:
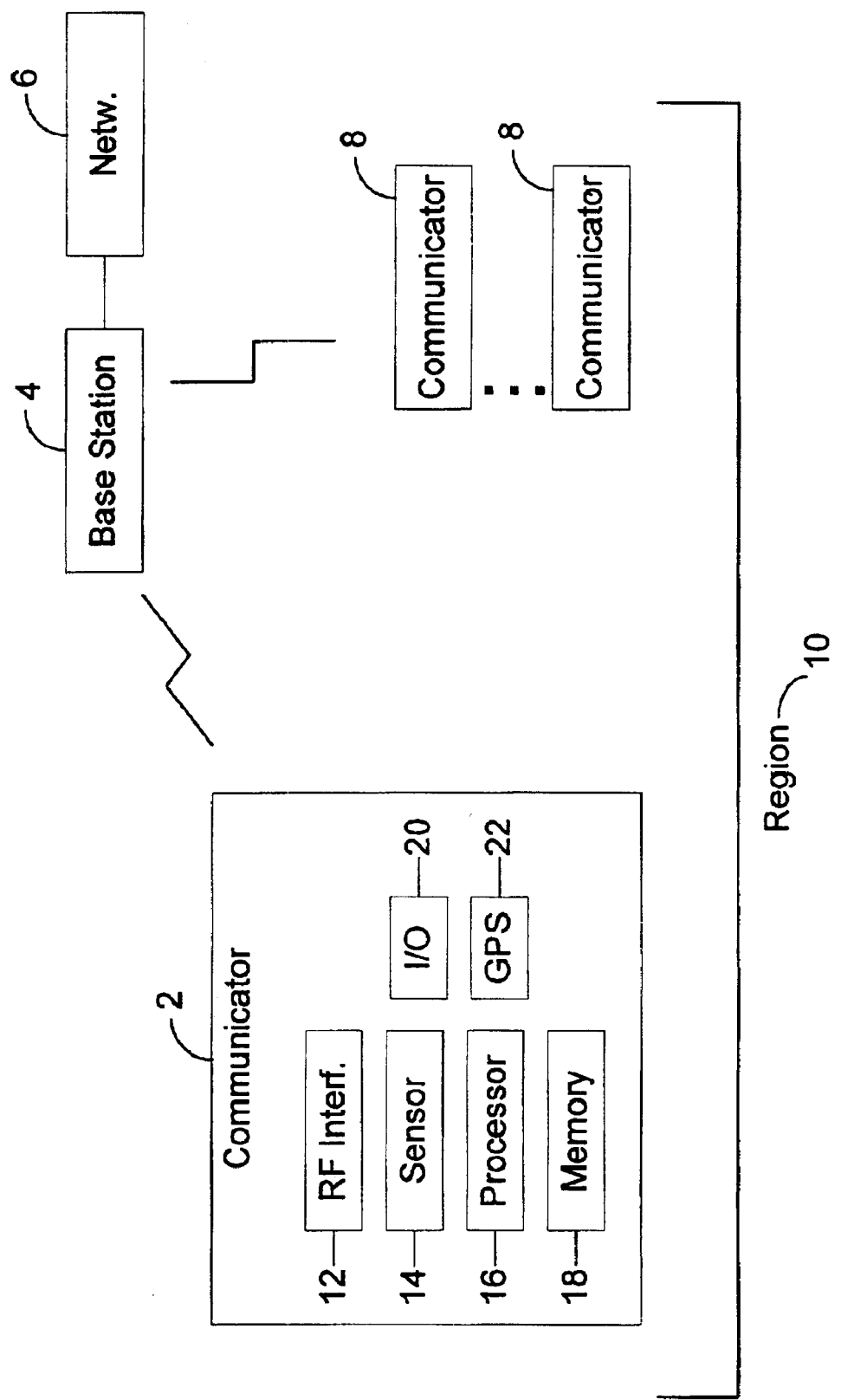
FIG. 1 is general system block diagram for implementing present invention.

Communication apparatus and method are described herein for automatically facilitating local or regional emergency alert service and system for wireless communicators or devices, such as cell-phone or pager users. Regional or local wireless text, voice, video and/or data broadcast to, or polling of, available, voluntary, or identified communication devices operating in proximate help area or region according to one or more protocol allows alerted or pre-registered users to respond to nearby emergency request or condition. Wireless communicator location is determined by relative satellite positioning, radio signal triangulation, or manual position entry. Various electronic, mechanical, optical or biological sensors, such as thermometer, timer, motion detector, smoke detector, toxic gas detector, biological contamination detector, theft or intrusion alarm, etc., may alert wireless communicator automatically of emergency condition.

Generally, network server or base station accesses a memory to store or retrieve one or more representation of a communicator or device located in one or more alert region or locale. Thus, a communications controller or network processor may cause an alert message or signal to be sent to one or more communicator or device located or determined soon to be located in a certain alert region locale. Such communicator or device preferably includes a portable mobile radio transceiver for wireless voice, data, video, or other media communication, such as a cellular telephone or pager.

The communications controller or network processor may operate according to software program instructions or other hardware programmable functions to cause one or more alert message or signal to be sent or otherwise transmitted electronically in response to an alert request or similar help beacon signal received by such controller or processor from a requesting communicator or device located or determined soon to be located in the alert region or locale.

In particular, such communicator or device located in the alert region uses a locator to determining current location, such as by calculating relative global satellite positioning (i.e., GPS), radio signal triangulation, or manual textual or graphical entry of address, Cartesian coordinates or map landmark by a user. Additionally, such communicator or device uses one or more electronic, mechanical, optical, or biological sensor to detect an alert or emergency condition, such as thermometer, timer, motion detector, smoke detector, toxic gas detector, biological contamination detector, theft or intrusion alarm, etc.

Preferably, the alert message or signal indicates a textual, audio, visual, or graphical location of a requesting communicator or device located in the alert region or locale, as well as possibly any emergency condition, update, resources, or activity. Optionally, a representation accessibly stored in communicator or device memory indicates an availability, willingness, qualification, or special emergency training of a user associated with a corresponding communicator or device located or determined soon to be located in the alert region or locale.

During multi-mode operation, the communications controller or network processor may cause automatically according to software program instructions or other hardware programmable functions an alert message to be sent or otherwise transmitted to a first communicator or device using one communication protocol (e.g., code-division signaling such as CDMA), and a second communicator or device using another, different communication protocol (e.g., time-division signaling such as TDMA, or frequency-division signaling such as FDMA).

Additionally, such controller or processor may cause the alert message or signal to be sent or otherwise transmitted using one communication protocol in response to an alert request or signal received by the controller or processor from a requesting communicator or device located or determined to be located soon in the alert region or locale using another, different communication protocol.

FIG. 1 system block diagram shows apparatus embodying wireless communication network for voice, data, text, video, or other media messaging or signaling between mobile, portable communication devices 2, 8 coupled through one or more radio or cellular telephone base station 4, which may couple to digital switching network 6, such as the Internet. Base station 4 may be distributed at different geographical sites conveniently positioned for effective mobile communication with various devices 2, 8, and may include one or more wireless or network communication interface, programmable processors or controllers, as well as storage or memory for operation according to present embodiment, possibly using one or more conventional communications protocol, such as various industry-standard cellular or other wireless signaling specifications, which are hereby incorporated by reference.

Requester communicator 2 includes one or more radio frequency transmit/receive communication interface 12, detector or sensor 14, processor or controller 16, memory or storage 18, user input/output interface 20, and locator or relative positioning module 22. Similarly, other communicators 8, which may co-locate with communicator 2 in alert region 10, may include functionally-equivalent components as communicator 2. However, communicator 2 may communicate with base station 4 using a different protocol, than communicators 8 may use to communicate with base station 4.

Figure 2:
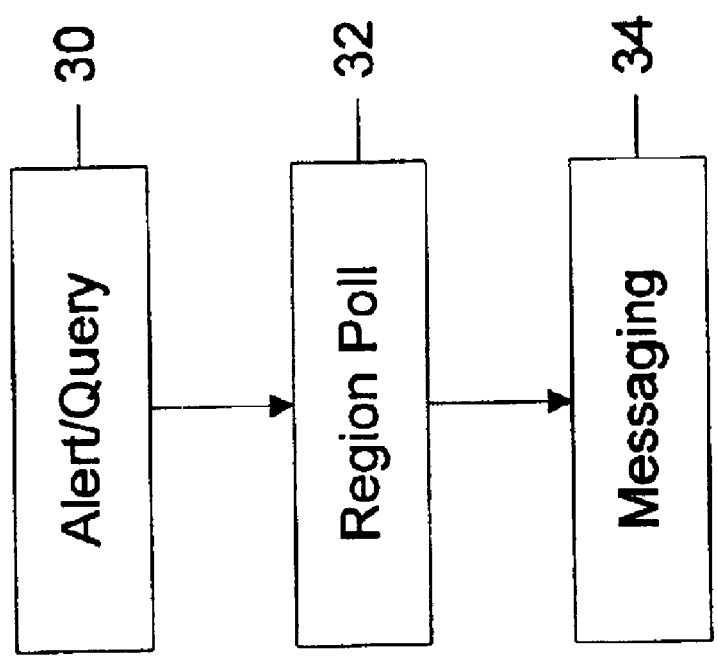
FIG. 2 is general operational flowchart for implementing present invention.

FIG. 2 operational flowchart shows operational steps alert/query 30, region polling 32, and messaging 34. Initially, requester communicator 2 may send an alert message or other emergency-type signal to base station 4, including location of communicator 2. This alert may be triggered automatically in real-time by one or more electronic, mechanical, optical or biological sensors coupled thereto, such as thermometer, timer, motion detector, smoke detector, toxic gas detector, biological contamination detector, theft or intrusion alarm, etc.

Alternately, such alert signal may be initiated by user on communicator interface 120 manually, for example, by entering special help request message on keyboard, or by pressing emergency alarm button.

Then, communications controller or network processor coupled to or included in base station 4 performs local region polling 32 to check whether any other communicators 8 are located in a common or relatively proximate geographic region or locale as requester communicator 2. This check may be accomplished automatically by computer software that checks a user registry or corresponding communicator database that identifies one or more users or communicators that are available, willing, qualified, or otherwise skilled to respond to various local emergency or alert requests from other communicators.

Additionally, such automatic check may be accomplished by calculating actual distance between requester communicator 2 and other candidate communicator 8 to identify which other communicators 8 are closest or within immediate vicinity to alert or request assistance. Optionally, those communicators 8 which are located in an immediately proximate area or locale (e.g., within 5–10 minutes transit time) are notified initially indicating nearby alert, while relatively further communicators 8 located in neighboring proximate area or locale (e.g., next city or community) may be notified subsequently with mere advisory alert.

Communicators 2, 8 may use global positioning satellite (GPS) receiver and technique to determine actual location map coordinates, particularly at certain alert or response time as determined accurately from one or more GPS satellite signal timestamp. As used herein, alert regions or locales may be predetermined areas within predefined boundaries, such as city or community limits, or dynamically defined relative to location of requester communicator 2, base station 4, or communicators 8.

Finally, such communications controller or network processor may facilitate text, voice, graphical, audio, video, or other media messaging or signaling between requester communicator 2 and one or more communicator 8 located in the alert region 10. Because communicator 2 and communicator 8 may communicate with base station 4 using different protocol, it is contemplated that base station 4 may be embodied in digitally interconnected, but different wireless communication equipment for transmitting and receiving radio signals at different frequencies or coding scheme.

Figure 3:
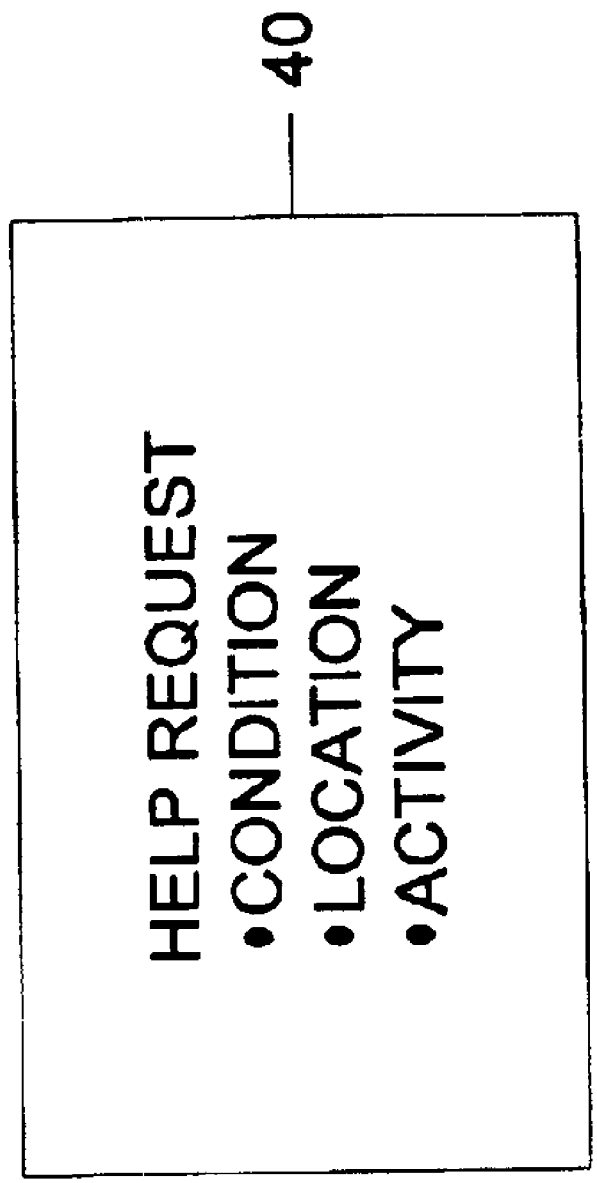
FIG. 3 is representative alert provided to communicator user per invention.

FIG. 3 shows representative alert 40 provided to communicator 8 user. Preferably, such alert is displayed textually and graphically, possibly including vibration, sound or voice alert, to describe a current local help request, especially describing a requester property or individual condition (e.g., car or home fire or theft in progress, overheating car with live occupant, etc.). Moreover, such alert may display or otherwise communicate communicator 2 location, preferably relative to communicator 8, thus facilitating local and immediate rescue or other assistance. Furthermore, such alert may report any recently updated activity associated with the particular help request.

Foregoing described embodiment of the invention is provided as illustrations and descriptions. They are not intended to limit the invention to precise form described. In particular, Applicants contemplate that functional implementation of invention described herein may be implemented equivalently in hardware, software, firmware, and/or other available functional components or building blocks. Other variations and embodiments are possible in light of above teachings, and it is thus intended that the scope of invention not be limited by this Detailed Description, but rather by Claims following.

What is claimed is:

1. Communication apparatus comprising:
   a memory for storing one or more representation of a communicator located in an alert region; and
   a controller for causing an alert message to be sent to at least one communicator in the alert region;
   wherein the alert message is generated automatically by computer software that checks for biological or toxic contamination sensed in the alert region for sending the alert message in a proximate area for immediate notification or neighboring proximate area for subsequent advisory, whereby such computer software enables a first alert message comprising an initial request for emergency help to be sent immediately to a first communicator located in a first area located proximately within about 10 minutes of transit time between a requester and the first communicator, and a second alert message comprising a mere advisory notification without request for emergency help to be sent subsequently to a second communicator located in a second area non-proximately located in a neighboring community, city or other further locale.

2. The apparatus of claim 1 wherein:
   the controller causes the alert message to be sent in response to an alert request received by the controller from a requesting communicator located in the alert region.

3. The apparatus of claim 1 wherein:
   at least one communicator located in the alert region comprises a locator for determining its location.

4. The apparatus of claim 1:
   at least one communicator located in the alert region comprises a sensor for determining an alert condition.

5. The apparatus of claim 1 wherein:
   the alert message comprises a location of a requesting communicator located in the alert region.

6. The apparatus of claim 1 wherein:
   at least one representation stored in the memory indicates an availability or a qualification of a user associated with a corresponding communicator located in the alert region.

7. The apparatus of claim 1 wherein:

the controller causes the alert message to be sent to a first communicator using a first communication protocol, and a second communicator using a second communication protocol.

8. The apparatus of claim 1 wherein:

the controller causes the alert message to be sent using a first communication protocol in response to an alert request received by the controller from a requesting communicator located in the alert region using a second communication protocol.

9. The apparatus of claim 1 wherein:

the controller causes an other message to be sent subsequently to the alert message to at least one communicator in a neighboring region.

10. In a communication network comprising a base station and one or more devices for communicating therewith, a device comprising:

a memory for storing an identifier of a user of the device, the user being pre-registered to send or receive an alert message to or from another device, when both such devices are located in an alert region; and means for determining a location of the device;

wherein the alert message is generated automatically by computer software that checks for biological or toxic contamination sensed in the alert region for sending the alert message in a proximate area for immediate notification or neighboring proximate area for subsequent advisory, whereby such computer software enables a first alert message comprising an initial request for emergency help to be sent immediately to a first device located in a first area located proximately within about 10 minutes of transit time between a requester and the first device, and a second alert message comprising a mere advisory notification without request for emergency help to be sent subsequently to a second device located in a second area non-proximately located in a neighboring community, city or other further locale.

11. The device of claim 10 further comprising:

a sensor for determining an alert condition to send the alert message.

12. The device of claim 10 wherein:

the alert message comprises the device location.

13. The device of claim 10 wherein:

the device identifier indicates an availability or a qualification of the user associated.

14. The device of claim 10 wherein:

the device and the another device send or receive messages using different communications protocol.

15. In a wireless network for signaling between a plurality of nodes, a communication method comprising the steps of:

receiving from a first node a first alert message comprising a location of the first node; and sending to a second node located in a region comprising the location a second alert message;

wherein the first or second alert message is generated automatically by computer software that checks for biological or toxic contamination sensed in the region for sending the first or second alert message in a proximate area for immediate notification or neighboring proximate area for subsequent advisory, whereby such computer software enables a first alert message comprising an initial request for emergency help to be sent immediately to a first node located in a first area located proximately within about 10 minutes of transit time between a requester and the first node, and a second alert message comprising a mere advisory notification without request for emergency help to be sent subsequently to a second node located in a second area non-proximately located in a neighboring community, city or other further locale.

16. The method of claim 15 wherein:

the first alert message comprises an identifier of a user associated with the first node, the user being pre-registered to send or receive one or more alert message to or from the second node, when both nodes are located in an alert region.

17. The method of claim 15 wherein:

the first and second alert messages the device are communicated using different protocol.

18. The method of claim 15 wherein:

the first alert message further comprises a time stamp.

19. The method of claim 15 further comprising the step of:

sending to a third node located in a neighboring region not comprising the location a third alert message.

* * * * *